United States Patent Office 2,740,929

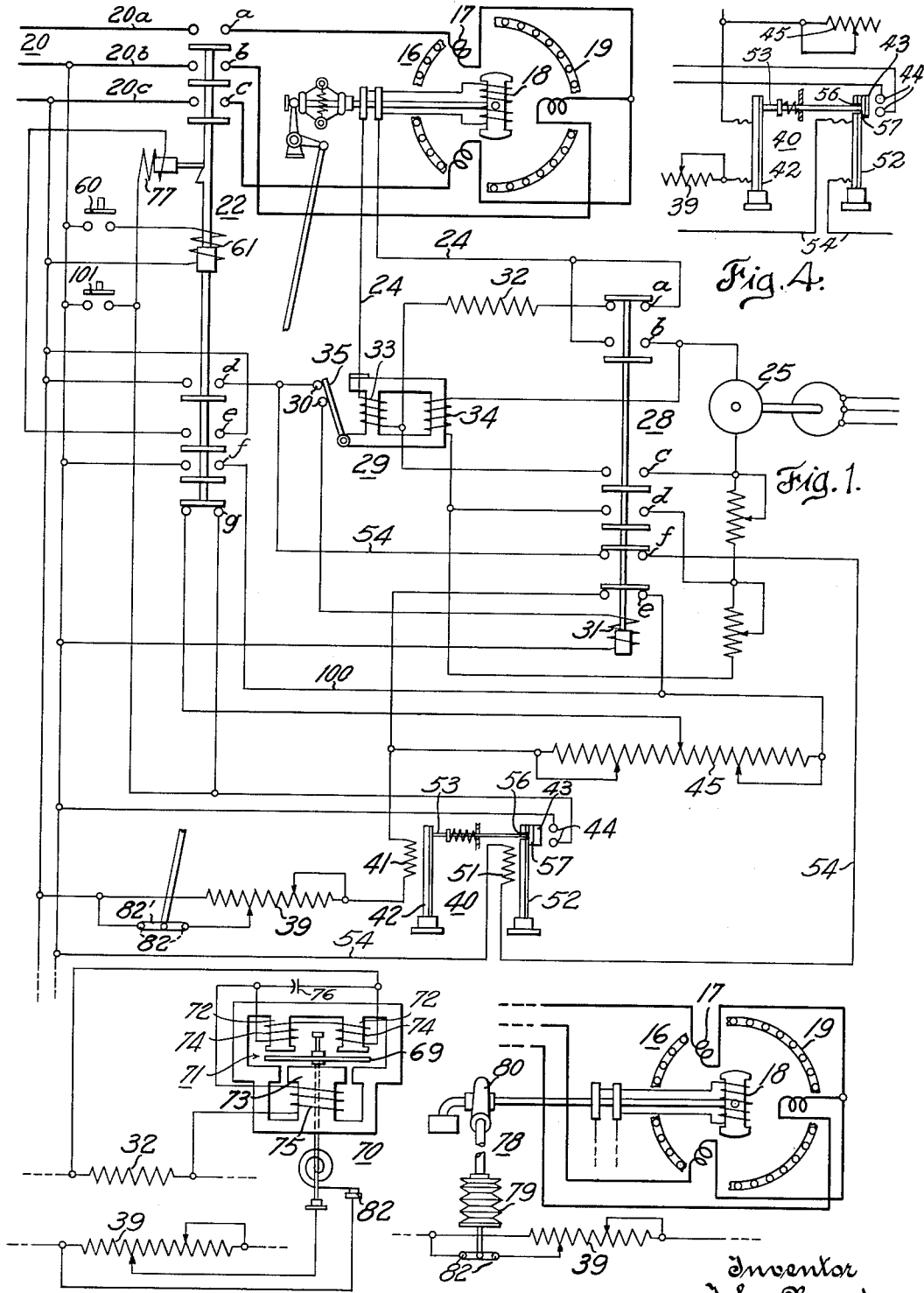
April 3, 1956
J. BAUDE
2,740,929
SYNCHRONOUS MOTOR CONTROL SYSTEM EMPLOYING A DUAL
CONTROL THERMAL RELAY AND ZERO SPEED SWITCH
COORDINATED WITH CIRCUIT BREAKER
Filed July 10, 1953
Inventor
John Baude
by Warren F. B. Lindley
Attorney

Patented Apr. 3, 1956

2,740,929

SYNCHRONOUS MOTOR CONTROL SYSTEM EMPLOYING A DUAL CONTROL THERMAL RELAY AND ZERO SPEED SWITCH COORDINATED WITH CIRCUIT BREAKER

John Baude, Milwaukee, Wis., assignor to Allis-Chalmers Manufacturing Company, Milwaukee, Wis.

Application July 10, 1953, Serial No. 367,182

10 Claims. (Cl. 318—170)

This invention relates to control arrangements and devices for electrical equipment and particularly to systems and devices for controlling the connections of an alternating current machine so as to protect it against predetermined abnormal conditions. More particularly this invention relates to control devices for protecting a secondary winding of an alternating current motor, such as a squirrel cage winding of a synchronous motor, from becoming overheated by the currents induced therein when the motor is operating subsynchronously.

Heretofore an attempt has been made to protect synchronous motors by thermal relays which lock the motor out should synchronization fail to occur within a definite time after starting. The time characteristic of this type of relay had to be such that the motor would have time enough to start both at reduced voltage and at full voltage. As a result of the relatively long time setting of the thermal relay for reduced voltage starting, the synchronous motor cage winding remained unprotected under conditions of pullout because the cage winding can operate under full voltage operating conditions only a very short time without overheating.

In order to illustrate the problem with a specific example, assume that a synchronous motor operating at fifty percent of normal voltage can use its cage winding for approximately one minute without overheating it. Since the heating of the cage winding varies with the square of the voltage, the same motor can operate only one-fourth of this time, or fifteen seconds at full voltage. It is obvious then that a relay which functions to protect the cage winding under all conditions and still permits sufficient time for starting on both reduced voltage and full voltage will have to be a relay which has not an invariable time characteristic, but which has a time characteristic which is adjustable to be coordinated with the magnitude of the voltage applied to the motor terminals.

In accordance with this invention, new and improved control systems and devices are provided by which the characteristics of a thermal relay are changed on a coordinate basis with primary circuit breaker operations to simulate the effect of motor terminal voltage variations. A means is provided which is cut in or out of the heater coil circuit of a thermal relay depending upon the circuit breaker position. These new and improved control arrangements and devices for starting synchronous machines are provided so that the thermal relay and associated equipment are correlated with the rates of heating and cooling of a secondary winding, such as the cage winding of a synchronous motor, to determine whether or not the motor control arrangement should function to shut down the motor or can respond to another motor starting operation.

It is therefore one object of this invention to provide a new and improved thermal relay.

Another object of this invention is to provide a new and improved lockout arrangement which disconnects a synchronous machine from a source of power in case abnormal conditions existed during the starting period.

A further object of this invention is to provide a new and improved control arrangement correlated with the connections of an alternating current motor so as to protect the motor against predetermined abnormal conditions.

A still further object of this invention is to provide a new and improved control arrangement for an alternating current motor in which the motor is deenergized in the event that the motor heats up and exceeds a predetermined temperature.

Another object of this invention is to provide a new and improved control arrangement for starting a synchronous motor in which the motor is protected against too frequent restarting unless its cage winding has cooled to a predetermined temperature.

Objects and advantages other than those set forth will be apparent from the following descriptions when read in connection with the accompanying drawing, in which:

Fig. 1 is a diagrammatic view of a synchronous motor and a control thermal relay therefor embodying the present invention;

Figs. 2 and 3 show modifications of the zero speed switch mechanism shown in Fig. 1; and Fig. 4 shows a modification of the thermal relay shown in Fig. 1.

Referring more particularly to the drawing by characters of reference, Fig. 1 illustrates an alternating current machine such as a synchronous motor 16 having an armature or primary winding 17, a field or secondary winding 18, and another secondary or squirrel cage winding 19. The synchronous motor 16 is connected to a suitable source of current 20, such as sixty cycle alternating current, indicated by conductors 20a, 20b and 20c, through a starting breaker 22. In this full voltage starting arrangement the field winding 18 is connected in series with a field discharge resistor 32 in a circuit 24 by a normally closed contact 28a of the field contactor or breaker 28. An exciter 25 may be driven from synchronous motor 16 or may be driven, as shown, by a separate motor and is used for exciting the field winding 18. The field winding 18 is connected to and disconnected from the exciter 25 by means of contacts 28b and 28c of the field contactor or breaker 28. Contactor 28 is controlled by means of a field application relay 29, which has contacts 30 in circuit with a coil 31 of the contactor 28.

Field application relay 29 is a simple, rugged device operable to close contacts 30 after acceleration of motor 16, when the frequency and magnitude of the induced current in field winding 18 have diminished to the desired values. Relay 29 has a winding 33 which is energized with a current proportional to the current in field winding 18. A coil 34 provides a substantially constant flux component in one direction through the core of relay 29, by reason of the energization of coil 34 from a substantially constant voltage direct current source, such as the exciter 25. Armature 35 is operatively responsive to the sum of the fluxes produced by coils 33 and 34. A detailed description of this particular field application relay 29 may be found in the United States Patent No. 2,478,693, W. J. Herziger, dated August 9, 1949.

For protecting the synchronous motor 16 from overheating during times of excessive starting duty, a new and improved heat responsive element or thermal relay 40 is provided. This thermal relay 40 may have other useful applications but is particularly useful for protecting the starting or cage winding 19 of machine 16 from overheating due to overloads or unsuccessful starts, pullouts, and too frequent starts. The protection afforded by relay 40 is based upon correlated time characteristics of the new relay 40 for simulating heating and cooling of the cage winding 19 of motor 16.

The thermal relay 40 comprises a current adjusting resistor 39, a first heater 41, a first bimetallic element 42, a second heater 51, a second bimetallic element 52, a movable contact 43 mounted on the end of a push rod 53 which is spring biased to contact open position, stationary contacts 44, and another resistor 45 which is arranged to vary the current in the heater 41.

The second bimetallic element 52 operates independently of the bimetallic strip 42 by means of heater 51. Both bimetallic strips 42 and 52 are arranged in such a manner that they deflect the contact actuating rod 53 in the same direction.

Bimetallic element 42 when deflected pushes rod 53 and contact 43 to the right. Rod 53 is mounted in an opening 56 in bimetallic element 52 so that it may move freely therethrough in contact closing direction. Upon the movement of bimetallic element 52 to the right, element 52 engages a shoulder 57 on rod 53 and actuates rod 53 and contacts 43 to the right in contact closing direction.

In this embodiment of the invention the control relay 40 is energized upon the closing of the starting breaker 22 which also functions as a running breaker. The operation of this control system is as follows: Upon closing a starting push button switch 60, current flows from conductor 20b through the push button switch 60 and closing coil 61 of breaker 22 to conductor 20c. Circuit breaker 22 closes and causes energization of the stator winding 17 of the synchronous motor 16. Current flowing through the stator winding 17 induces current in cage winding 19 and field winding 18 and causes the synchronous motor 16 to start to rotate. The induced current in the field winding circulates through the discharge resistor 32, the contacts 28a of the field contactor 28 and coil 33 of field application relay 29. The armature 35 of the field application relay 29 is attracted to the relay's iron core and by its movement opens contacts 30, and the contacts 30 remain open until the induced current frequency in the field winding circuit has decreased to a predetermined value. Current also circulates from the source 20b through contacts 22f of breaker 22, conductor 100, contacts 28e of breaker 28, heating element 41 of thermal relay 40, resistor 39, zero speed switch contacts 82 and back to conductor 20c. Under this operating condition, thermal relay 40 heats up rapidly until the zero speed switch 82' opens contacts 82 and reduces the circulating current through the heating element 41 to an amount which is adjusted to give sufficient time to synchronize motor 16. When the motor 16 nears synchronous speed, it is brought under the influence of the field application relay 29 because the flux in the relay 29 drops to substantially zero for a sufficient time to release the armature 35 and close contacts 30.

Upon closure of contacts 30 of relay 29, current flows from the source 20b through the closing coil 31, contacts 30 of relay 29, contacts 22d of breaker 22 and back to the source 20c. Energization of coil 31 closes the field contactor 28.

When the field contactor 28 closes, the current flow through the heater element 41 of the thermal relay 40 is reduced to coordinate the cooling of relay 40 with the cooling of the cage winding 19 of motor 16. Current flows from the source 20b through contacts 22f of breaker 22, conductor 100, resistor 45, which upon closing of contactor 28 is no longer short circuited by contacts 28e, heater element 41 of the thermal relay 40, resistor 39, and back to the source 20c. Resistors 45 and 39 and heater 41 are adjusted to have a combined resistance value which provides for action of the bimetallic element 42 of the thermal relay 40 in such a manner that the deflected position of this bimetallic strip 42 is coordinated with the cooling action of the cage winding of motor 16 under normal running conditions.

Motor 16 may be stopped by closing push button switch 101 which causes current to flow from the source 20b through push button switch 101, trip coil 77 and contacts 22e of the breaker 22, and back to the source 20c. Upon the energization of trip coil 77 circuit breaker 22 is actuated to interrupt the current flow to the primary winding 17 of the motor 16.

Motor 16 may be restarted at any time provided the thermal relay 40 has not reached that temperature at which contacts 43 and 44 engage.

If motor 16 has been successfully started but is pulled out of synchronism by a heavy load, contacts 30 open and the current flow through relay 40 is increased by the closing of contacts 28e of the field contactor 28. The closing of contacts 28e short circuits the resistor 45. Under this condition, current flows from the source 20b, through contacts 22f of breaker 22, contacts 28e of contactor 28, heating element 41 of thermal relay 40, resistor 39, and back to the source of supply 20c. In case the rotor of motor 16 locks in, in addition to pulling out of step, the zero switch 82' closes and current flow from 20b to 20c described above takes place through only part of resistor 39. By short circuiting part of resistor 39, the current is increased and the rate of heating of the thermal relay 40 is increased over the rate of heating during the pullout operation.

If breaker 22 is not opened manually by operation of the push button switch 101 before the thermal relay 40 closes its contacts 43, 44, the thermal relay acts as a lockout device by closing contacts 43, 44 and current circulates from the source 20b, through contacts 43, 44 of relay 40, trip coil 77, contacts 22e of breaker 22, and back to the source of supply 20c. After breaker 22 has been tripped open current still circulates from the source 20b through contacts 43, 44, contacts 22g, center tap of resistor 45, thermal element 41 of relay 40, resistor 39, zero speed switch contacts 82, and back to the source of supply 20c. The cooling of relay 40 then is retarded in proportion to the current flowing through the heater element 41 until contacts 43 and 44 of relay 40 separate, indicating that the thermal relay has fully reset.

If for some reason the heater 41 or the bimetallic thermally responsive element 42 fails to operate to control the operation of the synchronous motor 16, then the heater 51 and bimetallic thermally responsive element 52 operate to control synchronous motor 16. Heater 51 is connected in an electric circuit 54 in series with contacts 28f of contactor 28 and contacts 22d of circuit breaker 22 across the source of power 20b, 20c. Upon the closing of circuit breaker 22, heater 51 is energized. At a predetermined time determined by the temperature of the cage winding 19 of motor 16, the bimetallic element deflects enough to cause rod 53 to actuate contacts 43 so as to engage contacts 44. Current then circulates from the source 20b through contacts 43, 44 of relay 40, trip coil 77, contacts 22e of breaker 22, and back to the source of supply 20c. The energization of trip coil 77 causes circuit breaker 22 to open to deenergize motor 16.

The high speed bimetallic element 42 and heater 41 combination will actuate contacts 43 in contact closing direction before bimetallic element 52 by the action of heater 51 deflects sufficiently to push rod 53 and contacts 43 in contact opening direction. In this system, should the heater 41 fail or should any one of the circuit elements connected to the heater 41 fail, the circuit 54 of heater 51 acts as back up protection for heater 41 and bimetallic element 42.

The thermal relay 40 is so provided that the bimetallic element 42 has a relatively small thermal capacity and the bimetallic element 52 has a relatively large thermal capacity. Bimetallic element 42 is energized by the radiation or convection of heat from heater 41, and bimetallic element 52 is energized by the radiation or convection of heat from heater 51. Due to the low thermal capacity of the bimetallic element 42, it reaches a predetermined temperature and point of deflection before the bimetallic element 52 reaches a predetermined temperature and point of deflection. Thus, the bimetallic element 42 is provided to deflect to close contacts 44 before the bimetallic element 52 has absorbed enough heat to cause it to deflect a predetermined amount to close contacts 44. The thermal capacity of the bimetallic element 42 being less than the thermal capacity of the bimetallic element 52 causes bimetallic element 42 upon cooling to deflect to the left more rapidly than the bimetallic element 52. In order to provide a thermal relay in which the first bimetallic element 42 heats faster than the second bimetallic element 52 but cools slower than the second bimetallic element 52 it is necessary to provide a second current flow through heater 41 of a lower value than its original heating current. This second current flow through heater 41 retards the rate of cooling and deflection of bimetallic element 42 to a value below that of the rate of cooling of the bimetallic element 52. The bimetallic element 42 upon cooling to a predetermined temperature, opens the contacts 44 to open the circuit of trip coil 77 and thereby render the trip coil ineffective. The bimetallic element 52 upon cooling to a predetermined temperature disconnects trip coil 77 to permit breaker 22 to be closed by the operator closing the starting push button switch 60 if the bimetallic element 42 fails to render the trip coil 77 ineffective.

In accordance with this invention, relay 40 is responsive to the opening of breaker 22 and substitutes for the first current flow through the heater 41 a second lower current which retards the rate of cooling of the bimetallic element 42, but it also substantially reduces the current flow in the element 51 so that the rate of cooling of the bimetallic element 42 is reduced to a lower value than the rate of cooling of the bimetallic element 52.

Although elements 41, 42 and 51, 52 have been shown as separate elements, it is within the scope of this invention to use elements 42, 52 each of which serve as both the heater and bimetallic strip.

When applying this new and improved control system to motors already in operation in the field, it may be difficult under certain conditions to add a zero speed switch 82' as shown in Fig. 1. Switches 82' are usually driven by the shaft of the motor rotor and mechanical difficulties may prevent the application of such a switch.

In accordance with this invention, an under-frequency relay 70 shown in Fig. 2, is substituted for the zero speed switch 82' of Fig. 1 and is connected across the discharge resistor 32. Relay 70 comprises a disk 69, contacts 82, one of which is mounted on disk 69, an electromagnet 71 comprising an upper pole 72 and a lower pole 73. Potential coils 74 and 75 are provided on poles 72 and 73, respectively. The lower coil 75 has a capacitor 76 in series therewith. The under-frequency relay is so designed that at normal frequency (60 cycles) the upper coil current leads the lower coil current and the two out of phase fluxes thus produced act to give a contact opening torque on the disk 69 but not strong enough to separate contacts 82 of this zero speed switch. When the slip cycle frequency introduced in the circuit 24 of motor 16 drops, the phase angle of the lower coil circuit becomes more leading until at the frequency setting of the relay, the lower coil current begins to lead the upper coil current and the relay torque is reversed, thus separating the contacts 82. The lower the frequency, the greater the phase angle displacement, and hence the faster the contacts 82 separate. Contacts 82 upon opening reduce the circulating current through the heating element 41 in the same manner as does contact 82 of Fig. 1.

Fig. 3 illustrates a hydraulic zero speed switch 78 which may be substituted for the zero speed switches 82' and 70 shown in Figs. 1 and 2. The hydraulic switch 78 comprises a bellows 79 which is deflected by fluid pressure from any suitable pump 80 which may supply lubricant to the bearings of the synchronous motors. Upon rotation of the rotor of motor 16 the switch 78 opens contacts 82.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In combination, an alternating current rotating machine, a circuit breaker connected to a power circuit and said machine for energizing said machine, a thermal device for controlling said breaker, said device comprising a first thermally responsive element and a second thermally responsive element, electric circuits connecting said breaker to said device, means for closing said breaker to energize said machine and causing a first current to flow through said first element and a second current to flow through said second element, means for opening said breaker, means for decreasing said first current through said first element upon rotation of said machine, said elements upon reaching predetermined temperatures causing said breaker opening means to open said breaker and said machine to be deenergized, said first element reaching its predetermined temperature to open said breaker and deenergize said machine before said second element reaches its predetermined breaker opening temperature, means responsive to the opening of said breaker for substituting for said current through said first element a second lower current to retard the rate of cooling of said first element to a lower value than the value of the rate of cooling of said second element, said first element upon cooling to a predetermined temperature rendering said opening means ineffective, said second element rendering said opening means ineffective if said first element fails to operate.

2. In combination, an alternating current machine having a primary winding connected to an alternating current circuit and having a secondary winding, a circuit breaker for controlling said machine, a thermal device for controlling said breaker, said device comprising a first thermally responsive element and a second thermally responsive element, means for closing the breaker to energize said machine to cause rotation thereof and to cause a first current to flow through said first element and a second current to flow through said second element, means for opening said breaker, means responsive to the frequency of the induced current in said secondary winding of said machine for decreasing said first current through said first element, said elements upon reaching predetermined temperatures causing said breaker opening means to open said breaker and said machine to be deenergized, said first element reaching its predetermined temperature to open said breaker and deenergize said machine before said second element reaches its predetermined breaker opening temperature, means responsive to the opening of said breaker for substituting for said current through said first element a second lower current to retard the rate of cooling of said first element to a lower value than the value of the rate of cooling of said second element, said first element upon cooling to a predetermined temperature rendering said opening means ineffective, said second element rendering said opening means ineffective if said first element fails to operate.

3. In combination, an alternating current machine having a primary winding connected to an alternating current circuit and having a secondary winding, a circuit breaker for controlling said machine, a thermal device for controlling said breaker, said device comprising a first thermally responsive element and a second thermally responsive element, electric circuits connecting said breaker to said device, means for closing the breaker to energize said machine to cause rotation thereof and to cause a first current to flow through said first element and a second current to flow through said second element, means for opening said breaker, hydraulic means responsive to the rotation of said machine for decreasing said first current through said first element, said elements upon reaching predetermined temperatures causing said breaker opening means to open said breaker and said machine to be deenergized, said first element reaching its predetermined temperature to open said breaker and deenergize said machine before said second element reaches its predetermined breaker opening temperature, means responsive to the opening of said breaker for substituting for said current through said first element a second lower current to retard the rate of cooling of said first element to a lower value than the value of the rate of cooling of said second element, said first element upon cooling to a predetermined temperature rendering said opening means ineffective to permit said breaker to be closed and said machine to be energized, said second element rendering said opening means ineffective to permit said breaker to be closed and said machine to be energized if said first element fails to operate.

4. In combination, a circuit breaker connected to a power circuit and adapted to energize a load device, means for opening said breaker, a thermal device, said thermal device comprising a first thermally responsive element and a second thermally responsive element, electric circuits connecting said breaker to said thermal device, means for closing said breaker to cause current to flow through said circuits to heat said elements, said elements upon reaching predetermined temperatures causing said breaker opening means to open said breaker, said first element arranged to reach its predetermined temperature first to open said breaker, said second element arranged to reach its predetermined temperature second to open said breaker if it still remains closed, means responsive to the opening of said breaker for substituting for said current through said thermal device a second lower current to retard the rate of cooling of said first element, said first element upon cooling to a predetermined temperature rendering said breaker opening means ineffective.

5. In combination, a circuit breaker connected to a power circuit and adapted to energize a load device, a thermal device, said thermal device comprising a first thermally responsive element and a second thermally responsive element, electric circuits connecting said breaker to said thermal device, means for closing said breaker to cause current to flow through said circuits to heat said elements, means for opening said breaker, each of said elements upon reaching a predetermined temperature causing said breaker opening means to open said breaker, said first element arranged to reach its predetermined temperature to open said breaker before said second element reaches its predetermined breaker opening temperature, said second element opening said breaker if it still remains closed, means responsive to the opening of said breaker for substituting for said current through said thermal device a second lower current to retard the rate of cooling of said first element, said first element upon cooling to a predetermined temperature rendering said breaker opening means ineffective, said second element upon cooling to a predetermined temperature rendering said breaker opening means ineffective if said first element fails to operate.

6. In combination, a circuit breaker connected to a power circuit and adapted to energize a load device, a thermal device, said thermal device comprisng a first thermally responsive element and a second thermally responsive element, electric circuits connecting said breaker to said thermal device, means for closing said breaker to cause current to flow through said circuits to heat said elements, means for opening said breaker, said elements upon reaching predetermined temperatures causing said breaker opening means to open said breaker, said first element arranged to reach its predetermined temperature first to open said breaker, said second element arranged to reach its predetermined temperature second to open said breaker if it still remains closed, means responsive to the opening of said breaker for substituting for said current through said thermal device a second lower current to retard the rate of cooling of said first element to a lower value than the value of the rate of cooling of said second element, said first element upon cooling to a predetermined temperature rendering said breaker opening means ineffective, said second element rendering said breaker opening means ineffective if said first element fails to operate.

7. In combination, a circuit breaker connected to a power circuit and adapted to energize a load device, a thermal device, said device comprising a first thermally responsive element, a second thermally responsive element, and a pair of cooperating contacts, electric circuits connecting said breaker to said thermal device, means for closing the breaker to cause current to flow through said circuits to heat said elements, means for opening said breaker, said elements upon reaching predetermined temperatures causing said contacts to close to cause said breaker opening means to open said breaker, said first element arranged to reach its predetermined temperature first to close said contacts to open said breaker, said second element arranged to reach its predetermined breaker opening temperature second to close said contacts if said contacts are still open to open said breaker, means responsive to the opening of said breaker for substituting for said current through said thermal device a second lower current to retard the rate of cooling of said first element to a value below that of the rate of cooling of said second element, said first element upon cooling to a predetermined temperature opening said contacts rendering said opening means ineffective, said second element upon cooling to a predetermined temperature rendering said opening means ineffective if said first element fails.

8. In combination, a circuit breaker connected to a power circuit and adapted to energize a load device, a thermal device, said thermal device comprising a first thermally responsive element, a second thermally responsive element, and a pair of cooperating relatively movable contacts, electric circuits connecting said breaker to said thermal device, means for closing said breaker to cause a first current to flow through said first element and a second current to flow through said second element, means for opening said breaker, said elements upon reaching predetermined temperatures causing said contacts to close to cause said breaker opening means to open said breaker, said first element arranged to reach its predetermined temperature first to close said contacts to open said breaker, said second element arranged to reach its predetermined breaker opening temperature second to close said contacts if said contacts are still open to open said breaker, means responsive to the opening of said breaker for substituting for said first current through said first element a second lower current to retard the rate of cooling of said first element and to substantially reduce the current flow in said second element so that the rate of cooling of said first element is reduced to a lower value than the value of the rate of cooling of said second element, said first element upon cooling to a predetermined temperature rendering said opening means ineffective, said second element rendering said opening means ineffective if said first element fails to operate.

9. In combination, a circuit breaker connected to a power circuit and adapted to energize a load device, means for opening said breaker, a thermal device, said thermal device comprising a first heater and a first thermally responsive element associated with said first heater and a second heater and a second thermally responsive element associated with said second heater, electric circuits connecting said breaker to said heaters, means for closing said breaker to cause current to flow through said circuits to heat said heaters, said heaters upon bringing said elements to first predetermined temperatures causing said elements to deflect to actuate said breaker opening means to open said breaker, said first element arranged to deflect a predetermined distance first to open said breaker, said second element arranged to deflect a predetermined distance second to open said breaker if it still remains closed, means responsive to the opening of said breaker for substituting for said current through said first heater a second lower current to retard the rate of cooling of said first element, said first element upon cooling to a second predetermined temperature rendering said breaker opening means ineffective.

10. In combination, a circuit breaker connected to a power circuit and adapted to energize a load device, a thermal device, said thermal device comprising a first heater and a first thermally responsive element associated with said first heater and a second heater and a second thermally responsive element associated with said second heater, and a pair of cooperating relatively movable contacts, electric circuits connecting said breaker to said heaters, means for closing said breaker to cause a first current to flow through said first heater and a second current to flow through said second heater, means for opening said breaker, said elements upon reaching predetermined temperatures causing said contacts to close to cause said breaker opening means to open said breaker, said first element arranged to deflect a predetermined distance first to close said contacts to open said breaker, said second element arranged to deflect a predetermined distance second to close said contacts if said contacts are still open to open said breaker, means responsive to the opening of said breaker for substituting for said first current through said first heater a second lower current to retard the rate of cooling of said first element and to substantially reduce the current flow in said second heater so that the rate of cooling of said first element is reduced to a lower value than the value of the rate of cooling of said second element, said first element upon deflecting back another predetermined distance rendering said opening means ineffective, said second element upon deflecting back another predetermined distance rendering said opening means ineffective if said first element fails to operate.

No references cited.